(12) United States Patent
Corcoran et al.

(10) Patent No.: US 6,236,923 B1
(45) Date of Patent: May 22, 2001

(54) METHOD AND APPARATUS FOR CONTROLLING THE INFLATION PRESSURE OF A PNEUMATIC COMPACTOR

(75) Inventors: Paul T. Corcoran; Federico Fernandez, both of Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/208,238

(22) Filed: Dec. 9, 1998

(51) Int. Cl.⁷ .................................................. G06F 7/00
(52) U.S. Cl. ..................... 701/50; 340/442; 340/995; 404/122; 701/213
(58) Field of Search ................. 701/50, 36, 213, 701/300; 340/990, 995, 442, 444; 404/72, 122, 125, 127

(56) References Cited

U.S. PATENT DOCUMENTS 5,471,391   11/1995   Gudat et al. ........................... 701/50
5,587,698 * 12/1996   Genna .................................. 340/442
5,629,874 *  5/1997   Mittal et al. ......................... 702/140

* cited by examiner

Primary Examiner—William A. Cuchlinski, Jr.
Assistant Examiner—Edward Pipala
(74) Attorney, Agent, or Firm—Steve D. Lundquist

(57) ABSTRACT

A method and apparatus for controlling the inflation pressure on a pneumatic compactor. The method and apparatus includes means for dynamically determining a level of density of a material to be compacted, a control system for determining a desired inflation pressure as a function of the density, and an inflation pressure system for adjusting the inflation pressure in response to the desired inflation pressure.

15 Claims, 4 Drawing Sheets

Fig_1_
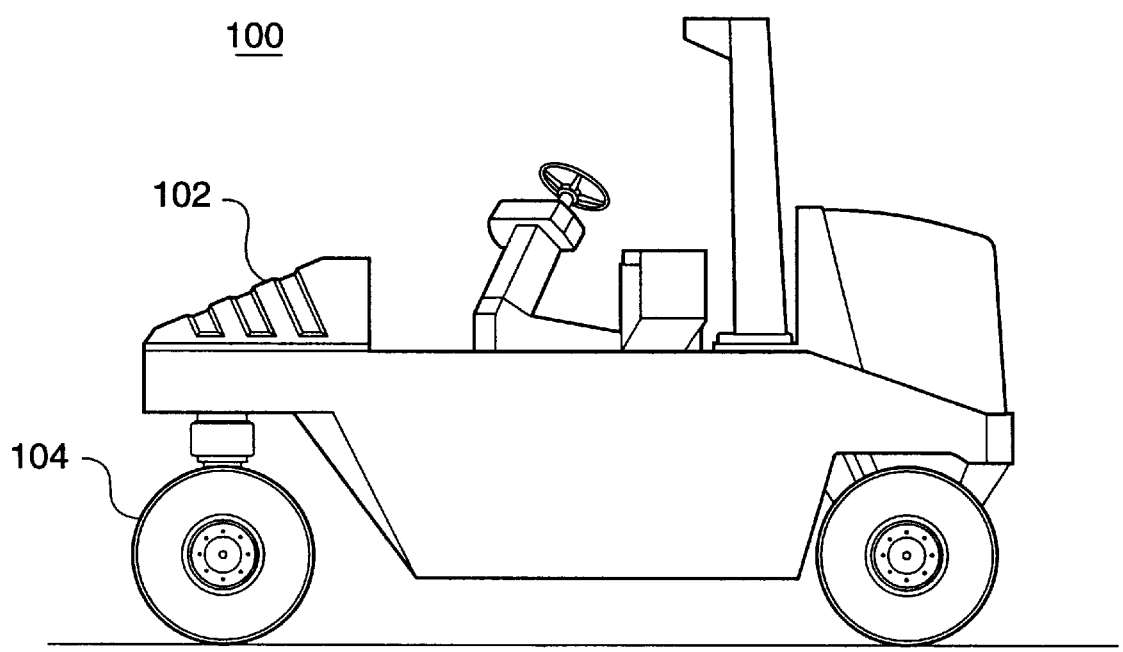

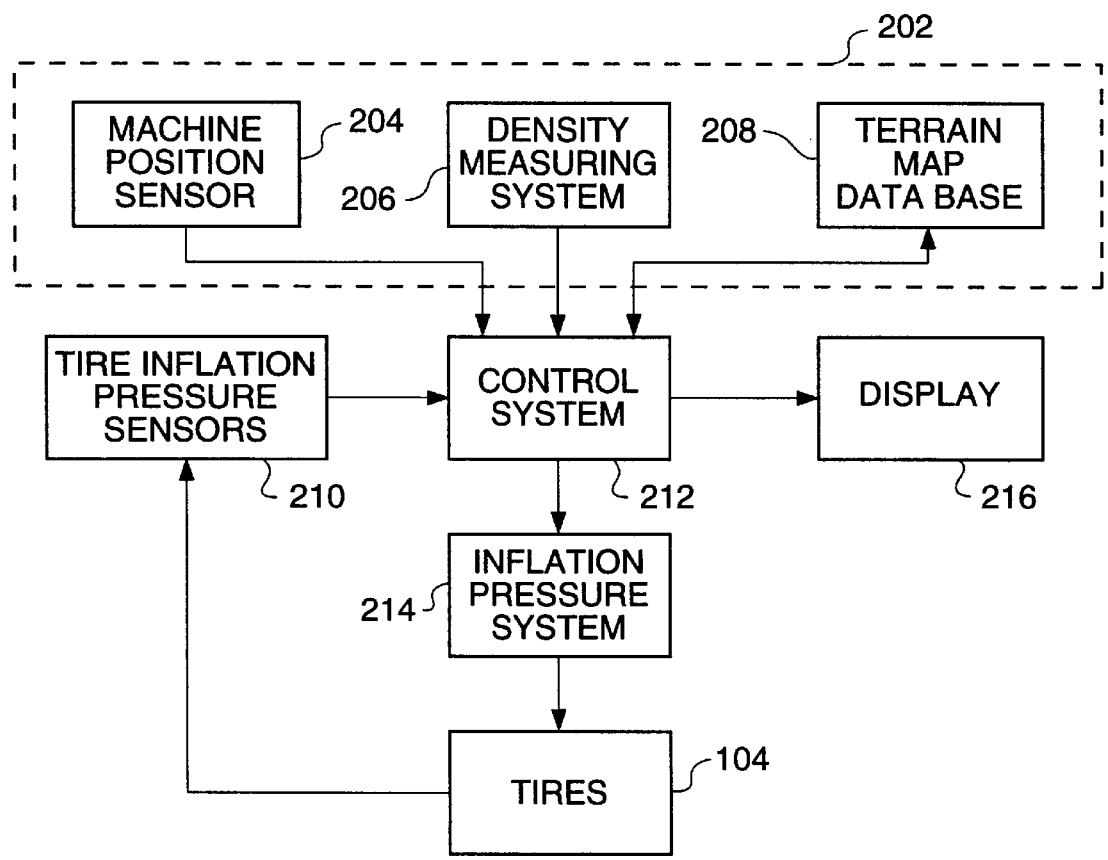
Fig_2_

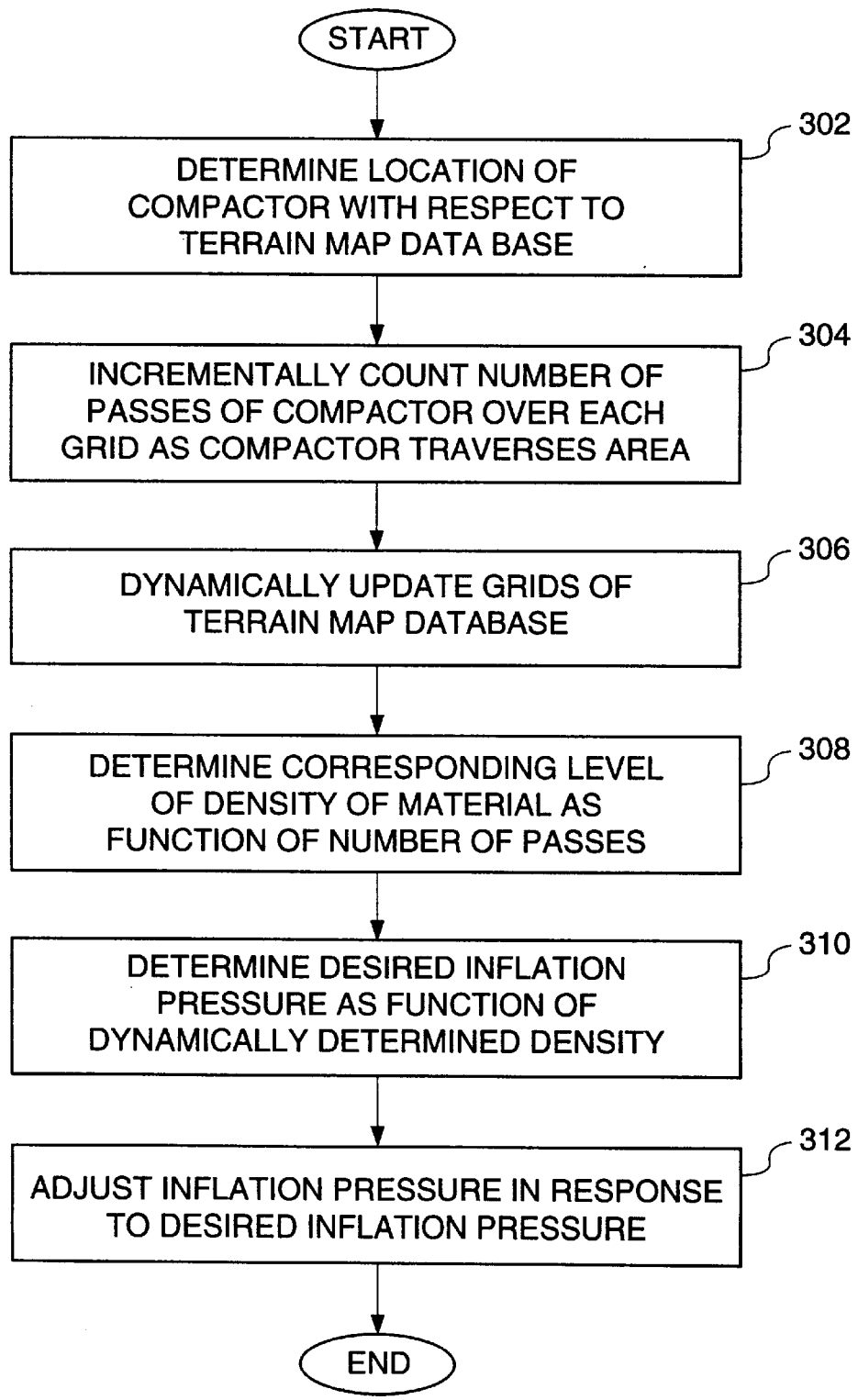

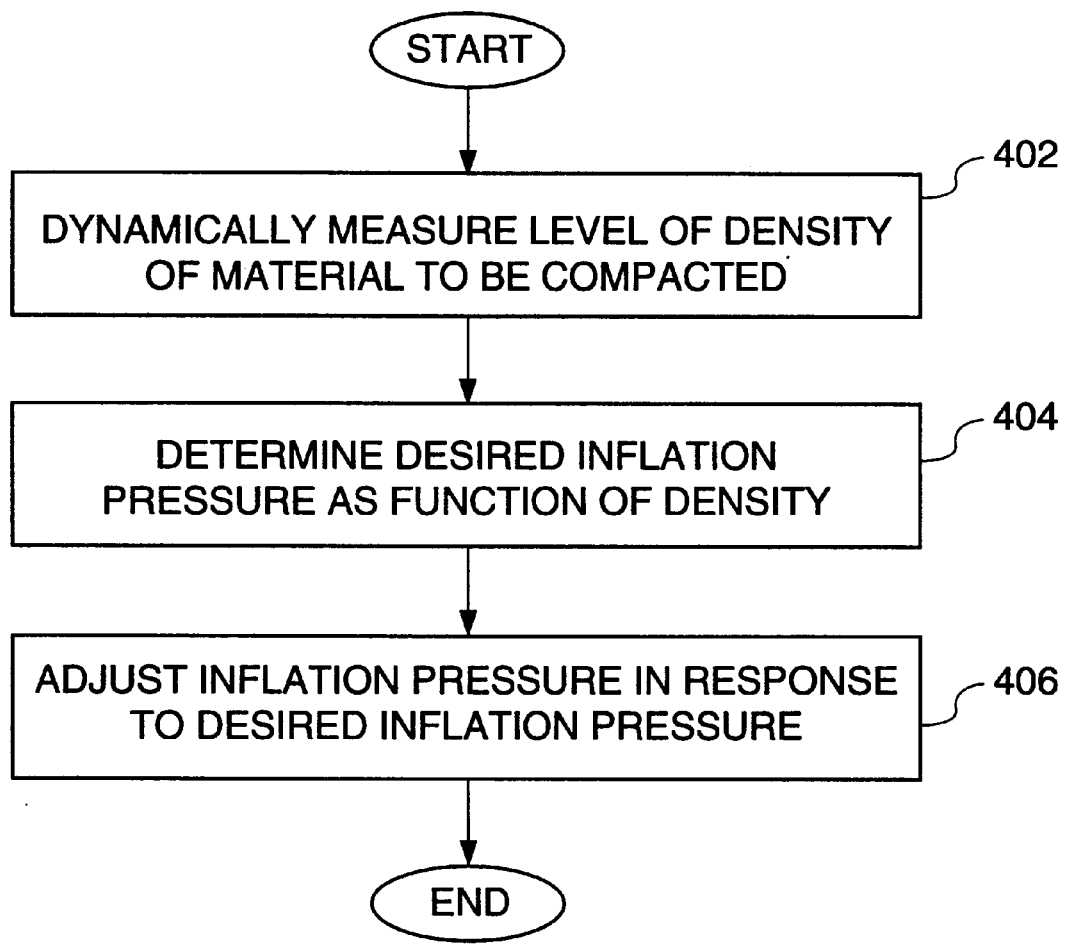

METHOD AND APPARATUS FOR CONTROLLING THE INFLATION PRESSURE OF A PNEUMATIC COMPACTOR

TECHNICAL FIELD

This invention relates generally to a method and apparatus for controlling the inflation pressure of a pneumatic compactor and, more particularly, to a method and apparatus for varying the inflation pressure of a pneumatic compactor as a function of the number of compaction passes performed.

BACKGROUND ART

Pneumatic compactors are often used to compact material, e.g., soil, asphalt, and the like, to a desired density. This process usually requires several passes over the material to achieve the desired compaction.

The performance of the pneumatic compactor varies as the inflation pressure of the tires changes.

For example, low inflation pressure improves the traction and mobility of the compactor on soft ground, and high inflation pressure results in more efficient compaction performance on firm surfaces.

Material being compacted is normally initially soft and of low density before compaction begins, and is of increasing density and firmness during subsequent passes of the compactor over the material. It would therefore be advantageous to optimize efficient operations of a pneumatic compactor by varying the inflation pressure of the tires as a function of the density of the material being compacted.

The present invention is directed to overcoming one or more of the problems as set forth above.

DISCLOSURE OF THE INVENTION

In one aspect of the present invention a method for controlling the inflation pressure on a pneumatic compactor is disclosed. The method includes the steps of dynamically determining a level of density of a material to be compacted, determining a desired inflation pressure as a function of the density, and adjusting the inflation pressure in response to the desired inflation pressure.

In another aspect of the present invention an apparatus for controlling the inflation pressure on a pneumatic compactor is disclosed. The apparatus includes means for dynamically determining a level of density of a material to be compacted, a control system located on the compactor and adapted to determine a desired inflation pressure as a function of the density, and an inflation pressure system located on the compactor and adapted to adjust the inflation pressure in response to the desired inflation pressure.

BRIEF DESCRIPTION OF THE DRAWINGS

FIG. 1 is a diagrammatic illustration of a pneumatic compactor suitable for use with the present invention;

FIG. 2 is a block diagram illustrating a preferred embodiment of the present invention;

FIG. 3 is a flow diagram illustrating an embodiment of a method of the present invention; and FIG. 4 is a flow diagram illustrating an alternate embodiment of a method of the present invention.

BEST MODE FOR CARRYING OUT THE INVENTION

Referring to the drawings, a method and apparatus 100 for controlling the inflation pressure of a set of tires 104 on a pneumatic compactor 102 is shown.

With particular reference to FIG. 1, a pneumatic compactor 102 suitable for use with the present invention is shown. The compactor 102 has a plurality of inflatable tires 104 to provide compaction force as the compactor 102 moves. The compactor illustrated in FIG. 1 has four tires 104 arranged transverse the direction of movement in the front of the compactor 102, and an additional four tires 104 arranged in like manner in the back of the compactor 102. However, other configurations could readily be employed. For example, a compactor 102 could have a total of four tires 104 used for compaction which are mounted near the four corners of the compactor 102 in a manner similar to the mounting arrangement on a typical wheeled vehicle.

Referring now to FIG. 2, a means 202 for dynamically determining a level of density of a material to be compacted is shown. The means 202 for determining the level of density may be configured by several embodiments.

For example, in a first embodiment, a terrain map database 208 of an area to be compacted is stored on board the compactor 102. The area to be compacted is divided into grids of a desired resolution. A machine position sensor 204 is located on the compactor 102, and determines the location of the compactor 102 with respect to the terrain map database 208 as the compactor 102 traverses the area. Preferably, the machine position sensor 204 is a GPS based system. However, other machine position determining systems, e.g., laser, dead reckoning, and the like, could be used as well.

Information from the terrain map database 208 and the machine position sensor 204 is delivered to a control system 212. The control system 212 uses this information to determine a number of passes of the compactor 102 over each grid. The control system 212 then responsively updates the grid information in the terrain map database 208. Each pass made by the compactor 102 over a grid is correlated to a level of density of the material in the grid. As the number of passes increment, the density of the material changes by a predetermined amount.

An example of a system for determining the density of material being compacted by the method described above is disclosed by Gudat et al. in U.S. Pat. No. 5,471,391.

In a second embodiment, a density measuring system 206 located on the compactor 102 measures the density of the material being compacted as the compactor 102 traverses the area. The density measuring system 206 may be of a type well known in the art, such as accelerometers, temperature indicators, nuclear density sensors, vibratory sensors, and the like. In addition, the density measuring system 206 may use technologies still under development at this time, e.g., machine power usage indicators, motion resistance indicators, and ground penetrating radar sensors, and may use any combination of technologies, well known or under development.

Alternatively, the means 202 for determining density may use a combination of the two embodiments described above, thus incorporating a density measuring system 206 with a machine position sensor 204 and a terrain map database 208.

The control system 212 is adapted to determine a desired inflation pressure as a function of the dynamically determined density. Preferably, the desired inflation pressure will vary in proportion to the density. For example, it is generally advantageous for the desired inflation pressure to be at a low value when compacting soft, low density material. Low inflation pressures allow the tires 104 to traverse the material more efficiently.

However, as the material becomes firmer and denser from repeated compactions, it is more advantageous to increase the desired inflation pressure to provide increased compaction performance from the compactor 102. The increased inflation pressure results in increased contact pressure being applied by the tires 104 of the compactor 102.

When the control system 212 determines a new value of desired inflation pressure, a command is delivered to an inflation pressure system 214, which in turn inflates the tires 104 to the new desired inflation pressure.

Alternatively, the control system 212 may deliver the new value of desired inflation pressure to a display 216 located on the compactor 102. The display 216 allows an operator to controllably inflate the pressure of the tires 104 to the desired inflation pressure.

At least one tire inflation pressure sensor 210 senses the actual inflation pressure of the tires 210, and delivers the actual inflation pressure value to the control system 212. The control system 212 can then either compare the actual inflation pressure with the desired inflation pressure for direct control of the inflation pressure system 214, deliver the actual inflation pressure to the display 216 for the operator to make the comparison, or both.

Referring now to FIG. 3, an embodiment of a method of the present invention is shown.

In a first control block 302, the location of the compactor 102 is determined with respect to the grids of the terrain map database 208. In a second control block 304, the control system 212 incrementally counts the number of passes of the compactor 102 over each grid as the compactor 102 traverses the area. Each pass of the compactor 102 over a grid corresponds to a proportionate level of density of the material in the grid.

In a third control block 306, the control system 212 dynamically updates the grids of the terrain map database 208 in response to the incremental count.

Control then proceeds to a fourth control block 308, where the control system 212 determines the corresponding level of density of material as a function of the number of passes. The actual values of the density may be determined by several methods. For example, prior experience with the particular type of material, lab testing to determine characteristics of compaction of the material, and periodic sampling of the density of the material over time may be used to establish a database of density values which correlate to the number of passes of the compactor 102. In addition, differences in characteristics of the compactor used may affect the density values corresponding to the number of passes.

In a fifth control block 310, a value of desired inflation pressure is determined as a function of the dynamically determined density of the material. In the preferred embodiment, the desired inflation pressure is chosen as a low value for soft material, i.e., material having a low value of density. The desired inflation pressure then increases in proportion to determined increases in density. This relationship between inflation pressure and density provides the most efficient balance between mobility and compaction over a range of soft to firm material.

In a sixth control block 312, the actual inflation pressures of the tires 104 are adjusted to the new desired inflation pressure values. In one embodiment, the adjustment is controllably performed by the control system 212. In another embodiment, the control system 212 provides the actual and the desired inflation pressure values to the operator on the display 216. The operator may then responsively control the inflation pressure system 214 to inflate the tires 104 to the desired inflation pressure. Preferably, the new desired inflation pressures are determined incrementally. This allows rapid adjustment of the inflation pressure for real time use in the field, yet does not require constant variance of the inflation pressure.

Referring now to FIG. 4, an alternate embodiment of a method of the present invention is shown.

In a first control block 402, the density of the material to be compacted is dynamically measured. Various methods for dynamically measuring the density of material are discussed above. In a second control block 404, the control system 212 determines the desired inflation pressure as a function of the measured density. In a third control block 406, the actual inflation pressure is adjusted to the desired inflation pressure value.

It is to be understood that the two embodiments described above may be performed independently or in combination with each other. For example, the density may be measured directly, the position of the compactor 102 may be determined, and the terrain map database 208 may be accessed and updated to take advantage of benefits of each embodiment.

INDUSTRIAL APPLICABILITY

As an example of an application of the present invention, a pneumatic compactor 102 is used to compact a surface material, such as soil or asphalt. Compaction of the material to a desired density will normally require several passes over the material, for example, three to five passes. During the first pass, the material is soft and porous, i.e., has a low density. The tires 104 of the compactor 102 would tend to sink into the material unless the inflation pressure of the tires 104 is set at a low value. However, during subsequent passes, the material becomes progressively more dense. Maintaining the inflation pressure of the tires 104 at the initial low value would decrease the compaction performance of the compactor 102. Therefore, it would be more efficient to incrementally increase the inflation pressure of the tires 104 each time a new pass over the material was initiated. It would be advantageous to perform this function automatically due to the difficulty in keeping track of how many passes have been made over which portions of the area to be compacted, or the difficulty in tracking the density throughout a compaction area if the density is measured directly.

Other aspects, objects, and features of the present invention can be obtained from a study of the drawings, the disclosure, and the appended claims.

What is claimed is:

1. A method for controlling the inflation pressure of a set of tires on a pneumatic compactor, including the steps of:

dynamically determining a level of density of a material to be compacted;

determining a desired inflation pressure in proportion to the dynamically determined density; and adjusting the inflation pressure in response to the desired inflation pressure.

2. A method, as set forth in claim 1, wherein dynamically determining a level of density includes the step of determining a level of density as a function of a number of passes over the material completed by the compactor.

3. A method, as set forth in claim 2, wherein determining a level of density as a function of a number of passes includes the steps of:

determining the location of the compactor with respect to a terrain map database of an area to be compacted, the area being divided into grids;

incrementally counting the number of passes of the compactor over each grid as the compactor traverses the area, each pass corresponding to an increased level of density of the material in the grid; and dynamically updating the terrain map database in response to the incremental count.

4. A method, as set forth in claim 1, wherein dynamically determining a level of density includes the step of measuring the density of the material.

5. A method, as set forth in claim 1, wherein determining a desired inflation pressure includes the step of determining a desired inflation pressure having a low value as a function of the density of the material being low, and determining desired inflation pressures having higher values as the density of the material increases.

6. A method, as set forth in claim 5, wherein the desired inflation pressures having higher values are increased incrementally as the density of the material increases.

7. A method, as set forth in claim 1, wherein adjusting the inflation pressure includes the step of notifying an operator of the compactor of a new desired value of inflation pressure, and providing the operator with a means for changing the inflation pressure to the new desired value.

8. A method, as set forth in claim 1, wherein adjusting the inflation pressure includes the step of enabling a control system to receive a value of a new desired inflation pressure and responsively activate an inflation pressure system to inflate the tires on the compactor to the new desired value.

9. An apparatus for controlling the inflation pressure of a set of tires on a pneumatic compactor, comprising:

means for dynamically determining a level of density of a material to be compacted;

a control system located on the compactor and adapted to determine a desired inflation pressure in proportion to the dynamically determined density; and an inflation pressure system located on the compactor and adapted to adjust the inflation pressure in response to the desired inflation pressure.

10. An apparatus, as set forth in claim 9, wherein the means for dynamically determining a level of density includes:

a terrain map database of an area to be compacted, the area being divided into grids; and a machine position sensor for determining the location of the compactor with respect to the terrain map database as the compactor traverses the area;

wherein the terrain map database and the machine position sensor are adapted to communicate data to the controller, the controller being further adapted to determine a number of passes of the compactor over each grid in response to the communicated data, each pass corresponding to an increased level of density of the material in the grid.

11. An apparatus, as set forth in claim 9, wherein the means for dynamically determining a level of density includes a density measuring system located on the compactor.

12. An apparatus, as set forth in claim 9, further including at least one tire inflation pressure sensor located on the compactor.

13. An apparatus, as set forth in claim 9, further including a display located on the compactor and adapted to display to an operator a desired and an actual inflation pressure of the tires.

14. A method for controlling the inflation pressure of a set of tires on a pneumatic compactor, including the steps of:

dynamically determining a level of density of a material to be compacted as a function of a number of passes over the material completed by the compactor, each pass corresponding to an increased level of density;

determining a desired inflation pressure in proportion to the dynamically determined density; and adjusting the inflation pressure in response to the desired inflation pressure.

15. A method for controlling the inflation pressure of a set of tires on a pneumatic compactor, including the steps of:

dynamically measuring a level of density of a material to be compacted;

determining a desired inflation pressure in proportion to the dynamically measured density; and adjusting the inflation pressure in response to the desired inflation pressure.

\* \* \* \* \*